UNITED STATES PATENT OFFICE.

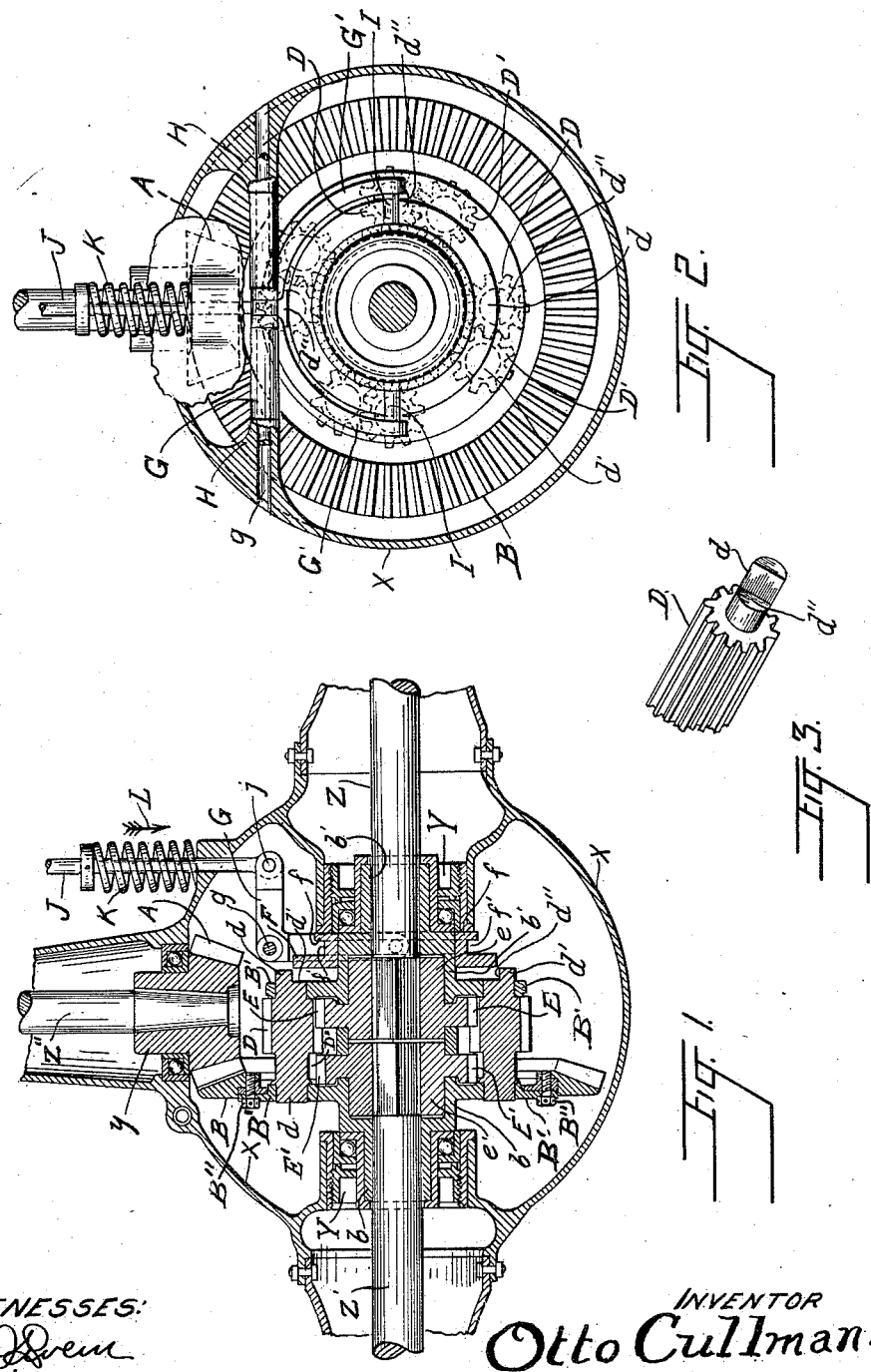

OTTO CULLMAN, OF CHICAGO, ILLINOIS.

DIFFERENTIAL DEVICE.

1,018,553. Specification of Letters Patent. Patented Feb. 27, 1912.

Application filed October 16, 1911. Serial No. 654,950.

*To all whom it may concern:*

Be it known that I, OTTO CULLMAN, a citizen of the United States, residing at Chicago, in the county of Cook and State of Illinois, have invented certain new and useful Improvements in Differential Devices, of which the following is a specification.

This invention relates to differential devices which are mounted on the power axle of motor propelled vehicles, to permit the vehicle to be driven from a straight course without slipping of the propelling wheels thereof.
To those skilled in the art it is known that at times one of the propelling wheels of a vehicle having a differential device on the axle thereof does not turn, while the other of said propelling wheels is turning, as when one of said wheels is in a hole, against an obstruction, or on wet clay; and only by locking said differential device can both wheels be made to turn. And the object of this invention is to obtain a pinion and gear differential device, of the usual type, which can be locked by the driver of the vehicle to which it is attached, so that the propelling wheels of said vehicle will necessarily be turned in unison.
A further object of the invention is to obtain a device which is easily operated, simple in construction, durable and not liable to get out of order.

A further object is to obtain a device of the kind named which will automatically unlock when released by the operator.

In the drawing, Figure 1 is a vertical section of a device embodying this invention. Fig. 2 is an end view, with the greater part of the casing of the device removed, to expose the working parts to view, and Fig. 3 is a perspective view of one end of a pinion forming an element of the device.

Similar letters refer to similar parts throughout the several views.

X is the shell or casing of a gear and pinion differential mechanism embodying this invention.

Y are the journal bearings provided in the casing of the device for the two part axle or propelling shaft Z, Z′ of a vehicle to which the device is applied, and $y$ is the journal bearing which is provided for the motor driven shaft Z″ which actuates the gears and pinions of the device.

A is a bevel gear, on driving shaft $y$.

B is a bevel gear intermeshing with gear A and driven thereby.

B′, B′, are the sides of the frame of the device. The gear B is mounted on one of the sides B′, and said sides form the bearings of the pinions and remaining gears of said device. Gear B is attached to one of the sides B′ by bolts B″. Sides B′ are respectively provided with hubs $b$, and $b′$ which turn loosely on two part shaft Z, Z′.

D, D′, are the geared pinions which are rotatably mounted in side B′ of the frame. Pinions D, D′, intermesh.

$d$, $d′$, are the shafts or hubs of pinions D, D′, respectively. The hub or shaft of one (or more) of the pinions D projects beyond the bearing thereof and is cut away, as at $d″$, on the said projecting part or portion.

E, E′, are gear wheels, which respectively intermesh with pinions D, D′. Gear wheels E, E′, are provided with hubs $e$, $e′$. Hubs $e$, $e′$, are respectively journaled in the hubs $b$, $b′$, respectively. The hubs $e$, $e′$, are provided with squared central apertures, and the adjacent ends of two part axle Z, Z′, are squared to fit in said central apertures respectively so that the rotation of said hubs rotates said parts.

The construction hereinbefore described with the exception of the projection of the end of shaft $d$ beyond the outer face of frame B′ and the cutting away of a part of said projecting end, as at $d″$, is the ordinary and well known construction of gear and pinion differential devices.

F is a disk provided with hub $f$. Hub $f$ is loosely mounted on the hub $b$ of frame B′ (see Fig. 1) and is provided with an annular groove $f′$.

G is a bell crank pivoted on shaft or pin $g$. Bell crank G is provided with fork G′.

H, H, are bosses on the inner face of casing X in which shaft or pin $g$ is held.

I, I, are pins in the ends of fork G′. Pins I, I, fit into groove $f′$ so that turning the bell crank on shaft $g$ slides disk F on hub $e$.

When pinions D are in the position illustrated in Figs. 1 and 2, the disk F may be slid closely to frame B′, the periphery of disk F at such time coming under the projecting ends of the hubs of pinions D, and said pinions are thereby locked so that they cannot turn. Gears E, E′, are thus locked together and must turn in unison.

J is a rod which is attached by pivot $j$ to one end of bell crank G and K is a spring on rod J yieldingly holding said rod in position on rod J so that disk F is out of engagement with the projecting ends of the hubs d.

To operate the device force is applied to the rod J, tending to move it in the direction indicated by arrow L, Fig. 1. As soon as the several hubs d get into the position illustrated in Fig. 1 the rod J will move in said direction and disk F will slide under or into engagement with the projecting end of hubs d and will prevent rotation of said hubs. On releasing the pressure on the rod J the spring K will return it to its initial position, releasing said disk F from engagement with said hubs d.

I claim:—

1. In a gear and pinion differential device, bearings, gear wheels and pinions rotatably mounted in the bearings, the pinions intermeshing and the gear wheels intermeshing with their respective pinions and one end of the shaft of one of said pinions projecting beyond the bearing thereof, with the part of said projected end which is on one side of a given diameter removed from said shaft, a movable disk, means to move said disk underneath the projecting end of said pinion shaft when the said diameter is substantially tangential to the periphery of said disk, and means to yieldingly hold said disk away from underneath said projecting end.

2. In a gear and pinion differential device, bearings, gear wheels and pinions rotatably mounted in the bearings, the pinions intermeshing and the gear wheels intermeshing with their respective pinions and one end of the shafts of said pinions projecting beyond the bearings thereof, with the parts of said projected ends which are one side of given diameters removed from said shafts, a movable disk and means to move said disk underneath the projecting ends of said pinion shafts when the said diameters are all substantially tangential to the periphery of said disk.

OTTO CULLMAN.

In the presence of—
CHARLES TURNER BROWN,
C. A. ADAMS.

---

Copies of this patent may be obtained for five cents each, by addressing the "Commissioner of Patents, Washington, D. C."